US012166301B2

(12) United States Patent
Nishii

(10) Patent No.: US 12,166,301 B2
(45) Date of Patent: Dec. 10, 2024

(54) CONNECTOR

(71) Applicant: SUMITOMO WIRING SYSTEMS, LTD., Mie (JP)

(72) Inventor: Hiroko Nishii, Mie (JP)

(73) Assignee: SUMITOMO WIRING SYSTEMS, LTD., Mie (JP)

(*) Notice: Subject to any disclaimer, the term of this patent is extended or adjusted under 35 U.S.C. 154(b) by 351 days.

(21) Appl. No.: 17/790,352

(22) PCT Filed: Dec. 21, 2020

(86) PCT No.: PCT/JP2020/047601
§ 371 (c)(1),
(2) Date: Jun. 30, 2022

(87) PCT Pub. No.: WO2021/140891
PCT Pub. Date: Jul. 15, 2021

(65) Prior Publication Data

US 2023/0043570 A1 Feb. 9, 2023

(30) Foreign Application Priority Data

Jan. 9, 2020 (JP) ................................ 2020-002048

(51) Int. Cl.
*H01R 12/57* (2011.01)
*H01R 12/71* (2011.01)
(Continued)

(52) U.S. Cl.
CPC ........... *H01R 12/712* (2013.01); *H01R 12/57* (2013.01); *H01R 13/2407* (2013.01); *H01R 13/405* (2013.01); *H01R 13/516* (2013.01)

(58) Field of Classification Search
None
See application file for complete search history.

(56) References Cited

U.S. PATENT DOCUMENTS 7,695,290 B2 * 4/2010 Nakano ................ H01R 12/707 439/83
2006/0068620 A1 3/2006 Okamura et al.
(Continued)

FOREIGN PATENT DOCUMENTS

EP 1560298 A1 * 8/2005 ........... H01R 13/516
JP H06-017170 U1 3/1994
(Continued)

OTHER PUBLICATIONS

International Search Report issued on Mar. 9, 2021 for WO 2021/140891 A1 (6 pages).

*Primary Examiner* — Tho D Ta
(74) *Attorney, Agent, or Firm* — Venjuris, P.C.

(57) ABSTRACT

It is aimed to provide a connector capable of stably holding terminal fittings in a housing. A connector is provided with a housing and terminal fittings to be held in the housing. The housing includes a plurality of holes arranged in a lateral direction, the terminal fittings being arranged inside the holes, an upper wall surface and a lower wall surface constituting upper and lower regions above and below the plurality of holes arranged in the lateral direction on a rear surface of the housing, and interpolar walls partitioning between the holes adjacent in the lateral direction. Rear surfaces of the interpolar walls are located forward of the upper wall surface and the lower wall surface. The housing includes recesses, the rear surfaces of the interpolar walls serving as back surfaces of the recesses.

5 Claims, 11 Drawing Sheets

(51) Int. Cl.

| | |
|---|---|
| ***H01R 13/24*** | (2006.01) |
| ***H01R 13/405*** | (2006.01) |
| ***H01R 13/516*** | (2006.01) |

(56) References Cited

U.S. PATENT DOCUMENTS

| | | | | |
|---|---|---|---|---|
| 2012/0064782 | A1 | 3/2012 | Kitajima | |
| 2016/0006194 | A1 | 1/2016 | Suemitsu | |
| 2017/0125929 | A1* | 5/2017 | Fujii | H01R 43/205 |
| 2018/0248291 | A1 | 8/2018 | Kitajima | |

FOREIGN PATENT DOCUMENTS

| | | | | | |
|---|---|---|---|---|---|
| JP | 2006100231 | A | * | 4/2006 | H01R 12/716 |
| JP | 2019-153493 | A | | 9/2019 | |

* cited by examiner

CONNECTOR

CROSS REFERENCE TO RELATED APPLICATIONS

This application is a national phase of PCT application No. PCT/JP2020/047601, filed on 21 Dec. 2020, which claims priority from Japanese patent application No. 2020-002048, filed on 9 Jan. 2020, all of which are incorporated herein by reference.

TECHNICAL FIELD

The present disclosure relates to a connector.

BACKGROUND

A board connector disclosed in Patent Document 1 includes a housing and a plurality of terminal fittings to be mounted into the housing. The housing is formed with a fitting recess, into which a mating housing is fit. A plurality of press-fit holes into which the terminal fittings are press-fit are provided in a back wall of the fitting recess. The plurality of press-fit holes are arranged in a width direction separately in two upper and lower stages. Walls (interpolar walls) partitioning between adjacent ones of the press-fit holes constitute parts of the rear surface of the housing and are exposed rearward.

PRIOR ART DOCUMENT

Patent Document

Patent Document 1: JP 2006-100231 A

SUMMARY OF THE INVENTION

Problems to be Solved

In the configuration of a housing in which interpolar walls provided between adjacent ones of a plurality of press-fit holes are exposed as in the board connector of Patent Document 1, an external matter may contact the rear surfaces of the interpolar walls. The contact of the external matter with the rear surfaces of the interpolar walls affects a holding state of terminal fittings by the housing. Thus, a configuration capable of stably holding the terminal fittings is required.

Accordingly, the present disclosure was completed on the basis of the above situation and aims to provide a connector capable of stably holding terminal fittings in a housing.

Means to Solve the Problem

The present disclosure is directed to a connector with a housing and terminal fittings to be held in the housing, wherein the housing includes a plurality of holes arranged in a lateral direction, the terminal fittings being arranged inside the holes, an upper wall surface and a lower wall surface constituting upper and lower regions above and below the plurality of holes arranged in the lateral direction on a rear surface of the housing, and interpolar walls partitioning between the holes adjacent in the lateral direction, rear surfaces of the interpolar walls are located forward of the upper wall surface and the lower wall surface, and the housing includes recesses, the rear surfaces of the interpolar walls serving as back surfaces of the recesses.

Effect of the Invention

According to the present disclosure, it is possible to provide a connector capable of stably holding terminal fittings in a housing.

DETAILED DESCRIPTION TO EXECUTE THE INVENTION

Description of Embodiments of Present Disclosure

Figure 1:
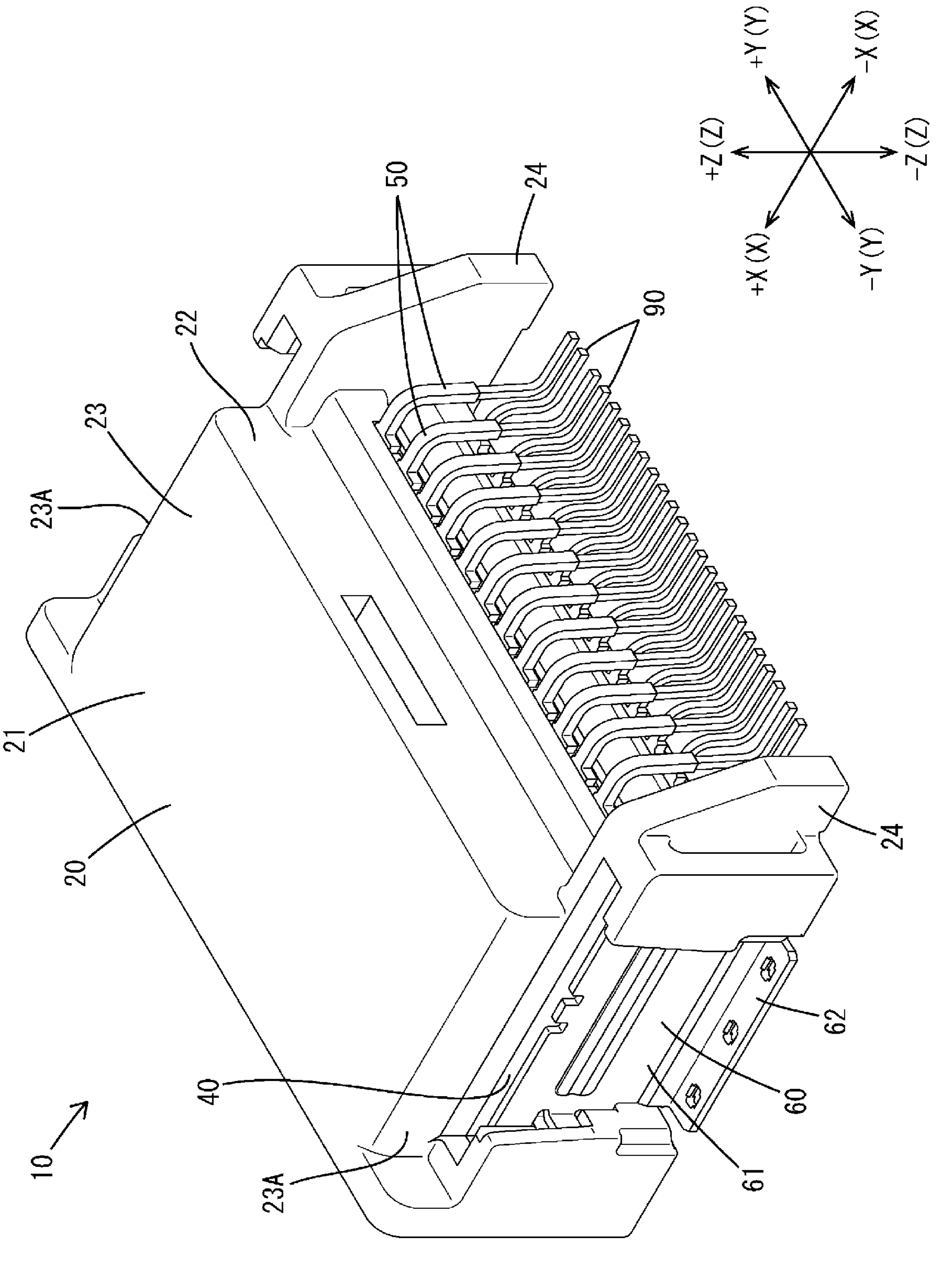
FIG. 1 is a perspective view of a connector of one embodiment.

First, embodiments of the present disclosure are listed and described.

(1) The connector of the present disclosure is provided with a housing and terminal fittings to be held in the housing, wherein the housing includes a plurality of holes arranged in a lateral direction, the terminal fittings being arranged inside the holes, an upper wall surface and a lower wall surface constituting upper and lower regions above and below the plurality of holes arranged in the lateral direction on a rear surface of the housing, and interpolar walls partitioning between the holes adjacent in the lateral direction, rear surfaces of the interpolar walls are located forward of the upper wall surface and the lower wall surface, and the housing includes recesses, the rear surfaces of the interpolar walls serving as back surfaces of the recesses.

In the housing, the rear surfaces of the interpolar walls between adjacent ones of the holes are constituted as the back surfaces of the recesses and located forward of the upper and lower wall surfaces. Thus, an external matter is less likely to directly contact the recesses by being blocked by the upper and lower wall surfaces. Therefore, the housing can stably hold the terminal fittings.

(2) Preferably, a rib continuously extending in the lateral direction is provided to project on the rear surface of the housing, rear parts of the plurality of holes are provided inside the rib, and the upper wall surface and the lower wall surface are provided on a rear surface of the rib.

According to this configuration, the rigidity of the rib in the lateral direction of the housing is enhanced and the housing is less likely to be warped. As a result, the arranged states and shapes of the recesses, the upper wall surface and the lower wall surface can be maintained.

(3) Preferably, the hole includes a hole body extending in a front-rear direction and stepped openings expanded toward both left and right sides from the hole body and open in the rear surfaces of the interpolar walls, the terminal fitting includes protruding portions protruding toward the both left and right sides in an intermediate portion in the front-rear direction, and the protruding portions are fit and arranged in the stepped openings and include parts projecting rearward from the stepped openings.

According to this configuration, the terminal fitting can be inserted into the hole of the housing from behind by placing a jig on the rear surfaces of the protruding portions. At this time, since rear end parts of the protruding portions project rearward from the stepped openings, the contact of the jig with the interpolar walls can be avoided.

(4) Preferably, a lateral dimension of a rear end of one of the protruding portions protruding toward the both left and right sides is larger than a lateral dimension of a rear end of the other protruding portion.

According to this configuration, the jig can be placed over a wide area of the rear end of the one protruding portion and a concern for the detachment of the jig from the protruding portion can be reduced.

(5) Preferably, the rear surface of the housing has side wall surfaces on both end parts in the lateral direction, and the side wall surfaces constitute a left region of the left hole and a right region of the right hole, out of the holes arranged on both ends in the lateral direction and are located rearward of the rear surfaces of the interpolar walls.

According to this configuration, the side wall surfaces are respectively provided, instead of the rear surfaces of the interpolar walls (back walls of the recesses), on a left side and a right side of the holes arranged on the both ends in the lateral direction. Thus, the strength of the holes arranged on the both ends in the lateral direction can be enhanced and the terminal fittings can be stably held in the holes.

DETAILS OF EMBODIMENT OF PRESENT DISCLOSURE

One specific embodiment of a connector of the present disclosure is described with reference to FIGS. 1 to 11. A connector 10 of this embodiment shown in FIG. 1 is a board connector and installed on a plate surface (surface) of a circuit board 70 as shown in FIG. 9. The connector 10 includes a housing 20, terminal fittings 50, 90 and fixing members 60. As shown in FIG. 9, the housing 20 is connectable to a mating housing 80.

<Housing>

Figure 2:
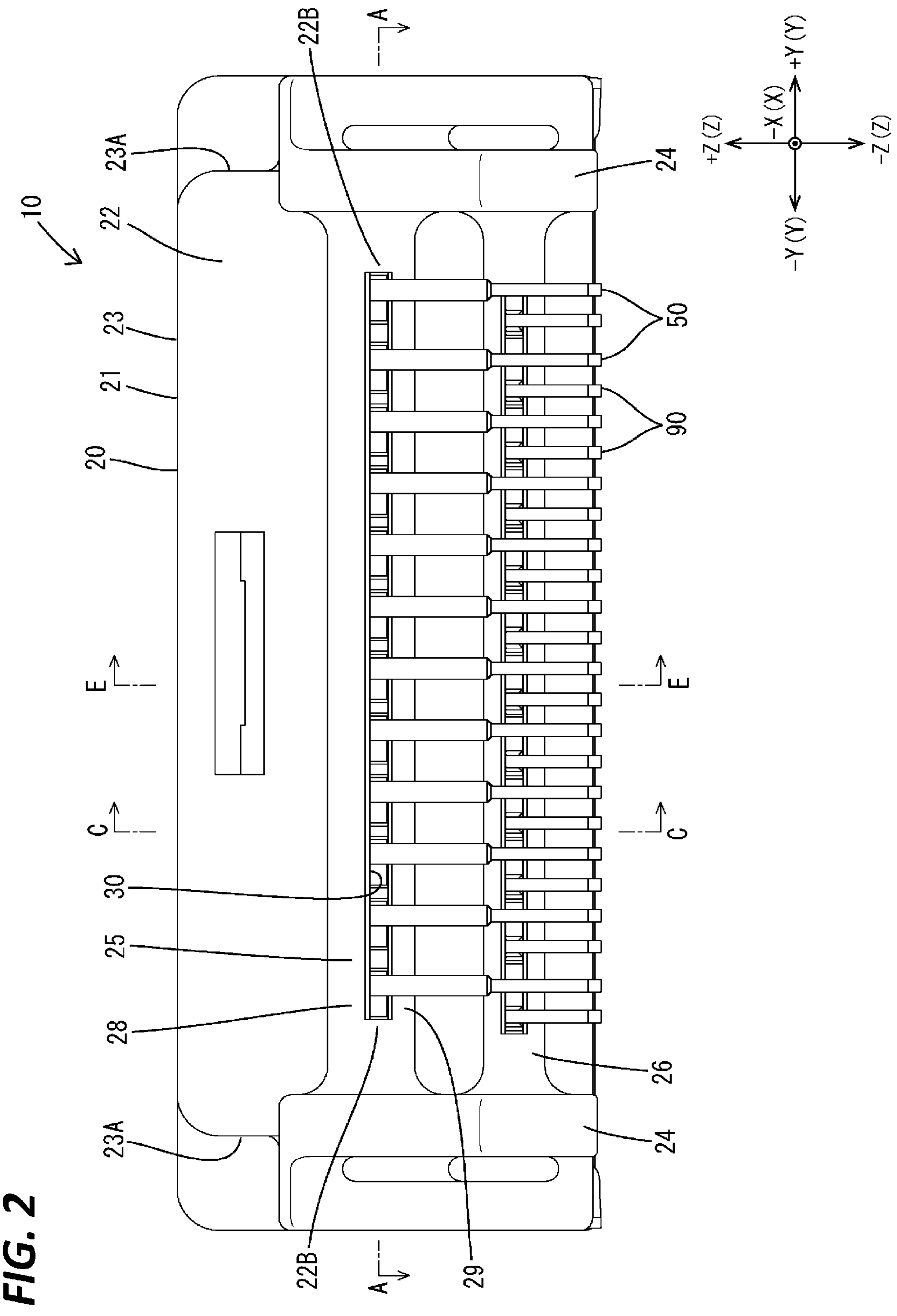
FIG. 2 is a back view of the connector.
Figure 3:
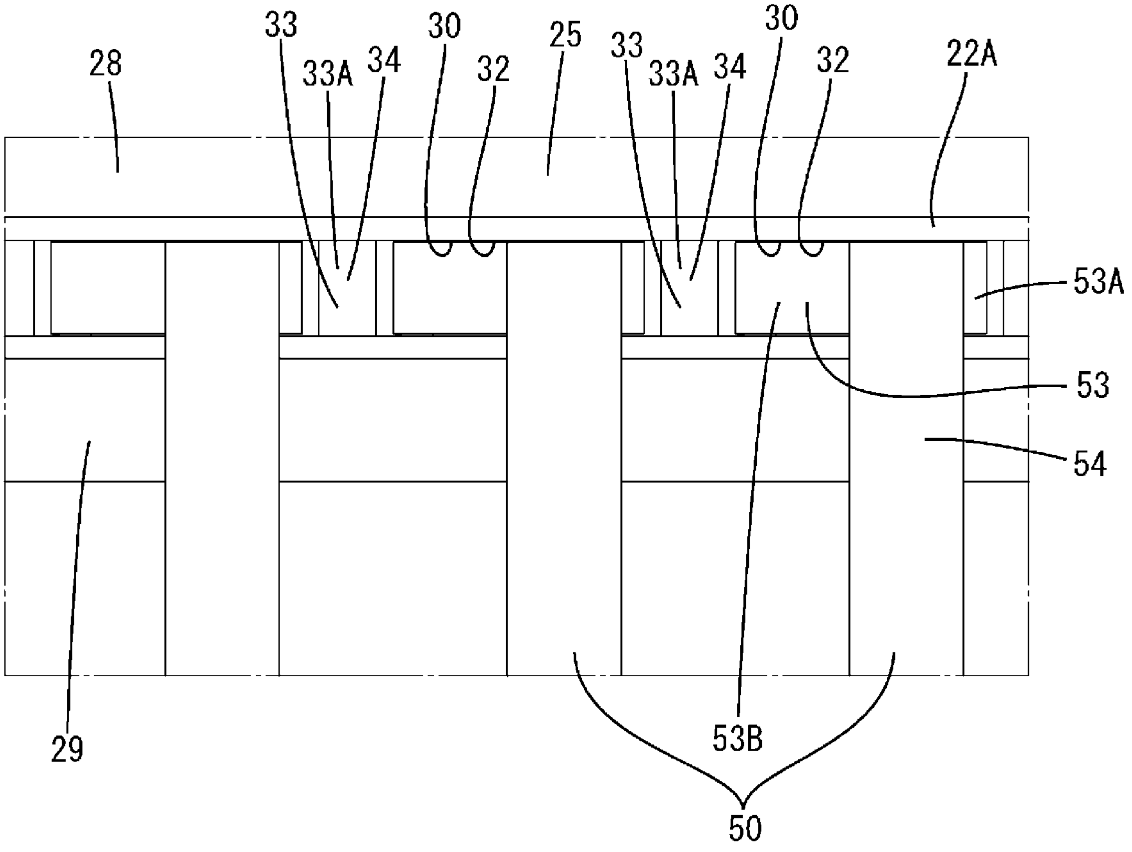
FIG. 3 is an enlarged view enlargedly showing holes of FIG. 2 and the vicinities of the holes.
Figure 4:
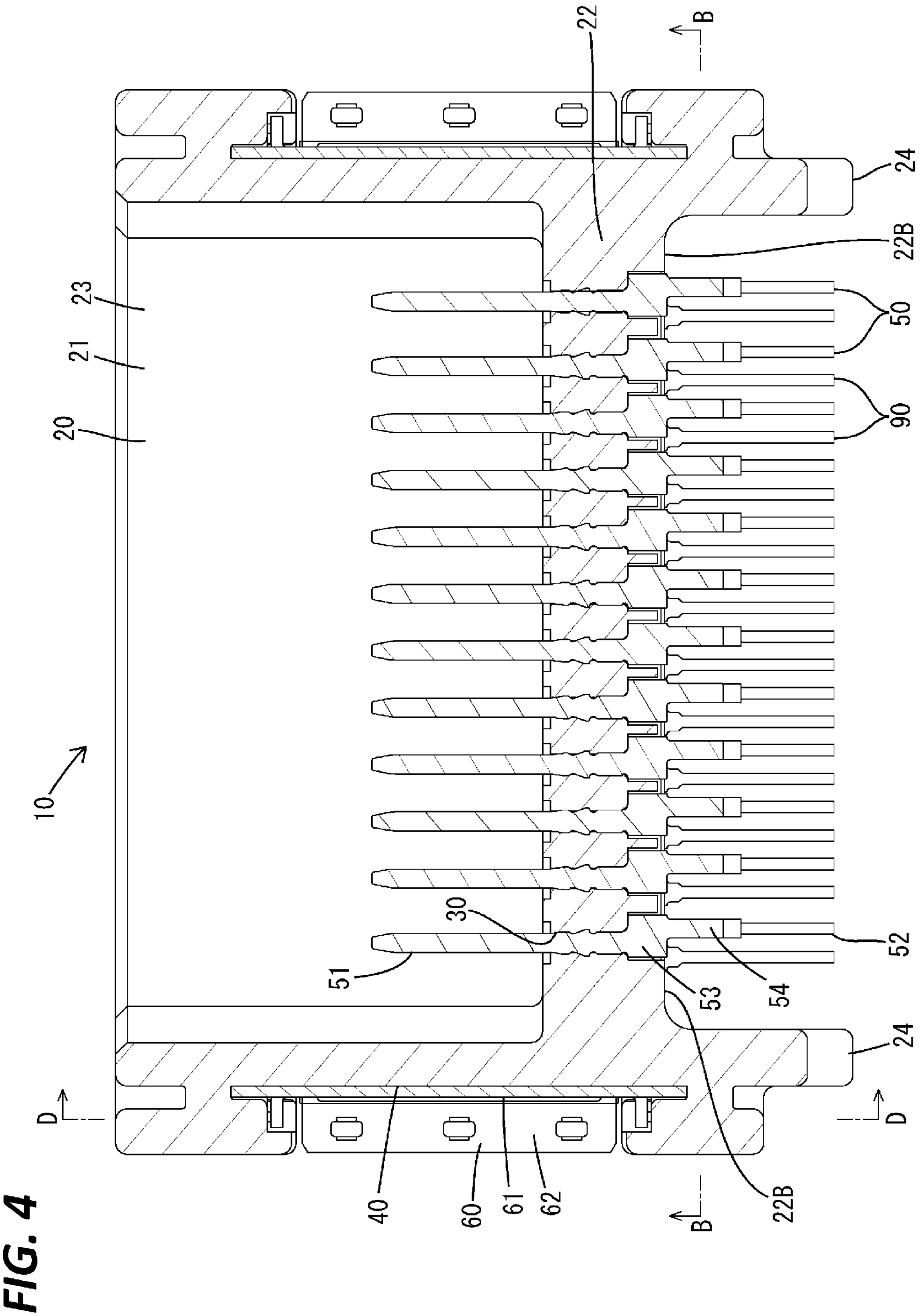
FIG. 4 is a section along A-A of FIG. 2.
Figure 7:
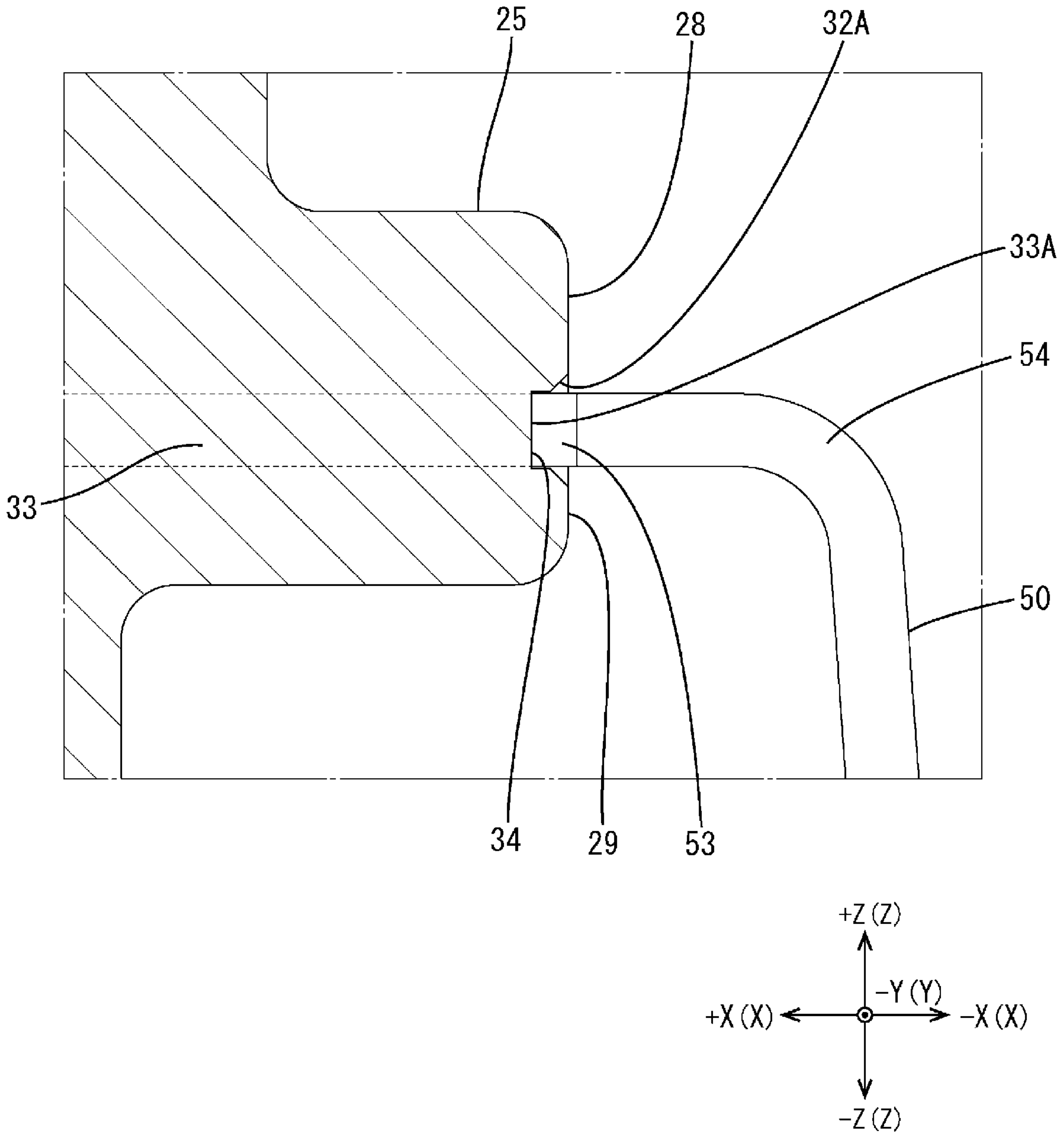
FIG. 7 is a section along C-C of FIG. 2.

The housing 20 shown in FIGS. 1 and 2 is made of synthetic resin. The housing 20 includes a receptacle 21 in the form of a rectangular tube open forward. The receptacle 21 has a back wall 22 extending along a vertical direction and a fitting portion 23 projecting forward from the outer edge of the back wall 22. A front-rear direction is a direction along a mounting direction of the housing 20 to the mating housing 80. Further, a "forward direction" is a direction from the back wall 22 toward the tip of the fitting portion 23, out of the front-rear direction. A "rearward direction" is a direction opposite to the "forward direction" and is a direction from the tip of the fitting portion 23 toward the back wall 22, out of the front-rear direction. In FIGS. 1, 2 and 4, the front-rear direction is shown as an X direction. In FIGS. 1, 2 and 7, the "forward direction" is shown as a +X direction and the "rearward direction" is shown as a −X direction.

As shown in FIG. 1, the back wall 22 is provided with a pair of protection walls 24 projecting rearward on both ends in a lateral direction. The fitting portion 23 has a pair of side walls 23A arranged to rise from the plate surface of the circuit board 70. The outer surfaces of the both side walls 23A are formed flat (perpendicular) along the vertical direction. As shown in FIG. 9, a lock portion 23B to be locked to a lock arm 82 of the mating housing 80 is provided inside the front end of the fitting portion 23.

As shown in FIG. 2, the back wall 22 is provided with an upper rib 25 and a lower rib 26 projecting rearward in two upper and lower stages. The upper and lower ribs 25, 26 continuously extend in the lateral direction. Rear parts of holes 30 to be described later are provided inside the upper and lower ribs 25, 26.

The lateral direction is a direction intersecting the front-rear direction and extending along width directions of the terminal fittings 50, 90. A "leftward direction" is one lateral direction when the connector 10 is in such a posture that a predetermined reference direction (+Z direction to be described later) coincides with a gravity direction and is viewed from the front to the rear. A "rightward direction" is a direction opposite to the leftward direction, out of the lateral direction. The vertical direction is a direction intersecting the front-rear direction and lateral direction. In FIGS. 1, 2 and 7, the lateral direction is shown as a Y direction. In FIGS. 1, 2 and 7, the "leftward direction" is shown as a +Y direction and the "rightward direction" is shown as a −Y direction. In FIGS. 1, 2 and 7, the vertical direction is shown as a Z direction. In FIGS. 1, 2 and 7, an "upward direction" is shown as a +Z direction and a "downward direction" is shown as a −Z direction. In this embodiment, the lateral direction perpendicularly intersects the front-rear direction. Note that perpendicular intersection includes a substantially perpendicularly intersecting state in addition to a strictly perpendicularly intersecting state. In this embodiment, substantially perpendicular means a state where an angle formed by one direction and another directions is 80° or more and less than 90°, preferably a state where this angle is 85° or more and less than 90° and more preferably a state where this angle is 88° or more and less than 90°. In this embodiment, a direction along one and the other directions means a state parallel or substantially parallel to the one and the other directions. In this embodiment, substantially parallel means a state where the angle formed by the one and the other directions is 170° or more and less than 180°, preferably a state where this angle is 175° or more and less than 180° and more preferably a state where this angle is 178° or more and less than 180°.

An upper wall surface 28 and a lower wall surface 29 constituting upper and lower regions above and below the holes 30 to be later are provided on the rear surface of the housing 20 (rear surface of the upper rib 25) (see FIG. 7). Note that the lower rib 26 is also provided with wall surfaces similar to the upper and lower wall surfaces 28, 29 of the upper rib 25.

Figure 5:
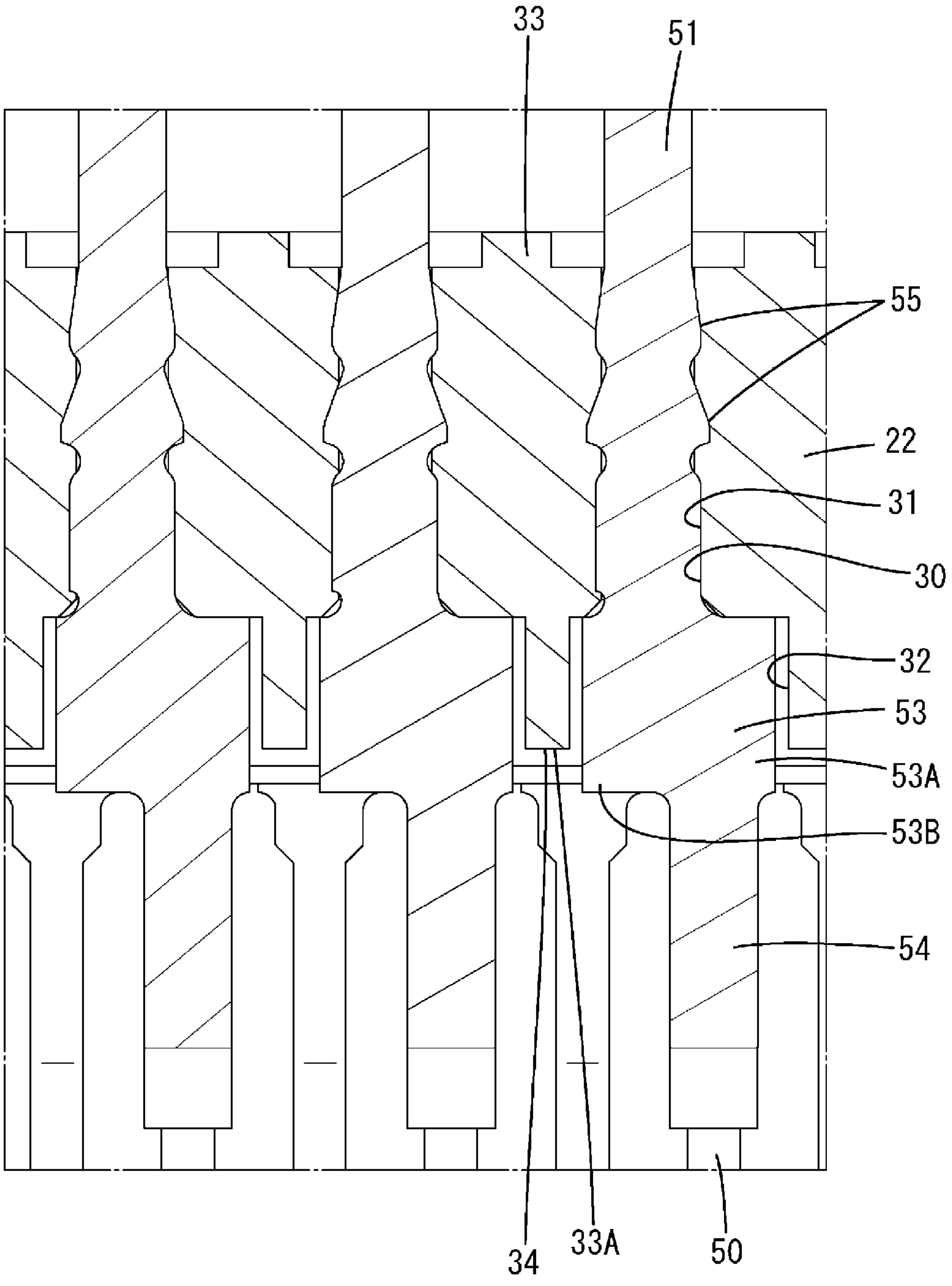
FIG. 5 is an enlarged view enlargedly showing holes of FIG. 4 and the vicinities of the holes.
Figure 6:
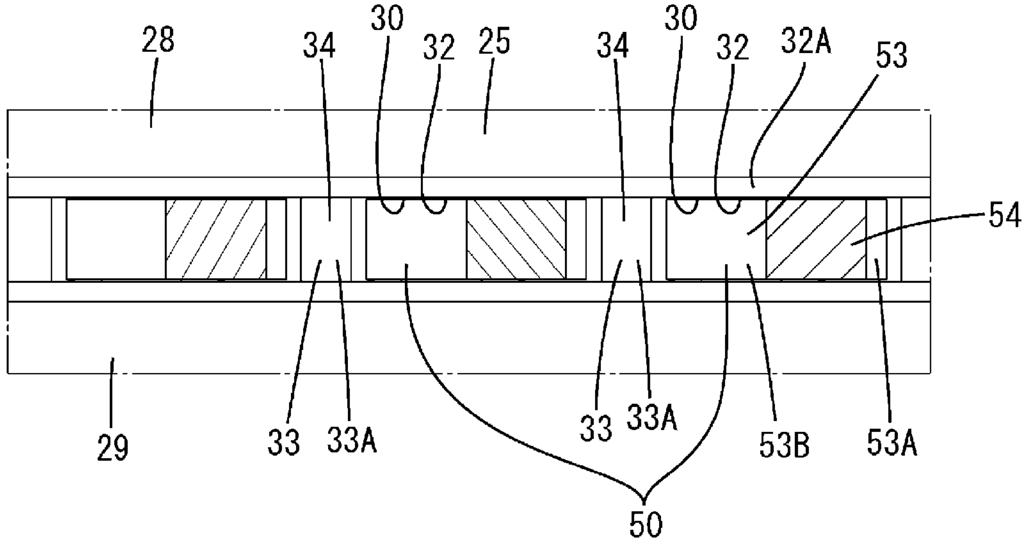
FIG. 6 is a section along B-B of FIG. 4.

As shown in FIGS. 4 and 5, a plurality of the holes 30, in which the terminal fittings 50 are arranged, are provided to penetrate through the back wall 22 in the front-rear direction. The terminal fittings 50 are press-fit and held in the respective holes 30 of the back wall 22. A plurality of the holes 30 are arranged in the lateral direction in each of two upper and lower stages. The respective holes 30 in the upper stage are described below, but the respective holes 30 in the lower stage are similarly configured. Specifically, the configuration of the respective holes 30 in the lower stage is laterally inverted from that of the respective holes 30 in the upper stage. As shown in FIGS. 2 and 7, the rear part of each hole 30 in the upper stage is provided inside the upper rib 25. The hole 30 includes a hole body 31 and stepped openings 32. The hole body 31 is provided on a front end side of the back wall 22. A mate connecting portion 51 of the terminal fitting 50 to be described later is press-fit into the hole body 31 from behind. The mate connecting portion 51 is retained and held in the hole body 31 by the locking action of locking pieces 55. The stepped openings 32 are provided on a rear end side of the back wall 22. The stepped openings 32 are expanded toward both left and right sides from the hole body 31 extending in the front-rear direction, and open in rear surfaces 33A of interpolar walls 33. Protruding portions 53A, 53B of the terminal fitting 50 to be described later are fit and arranged in the stepped openings 32. The stepped openings 32 are connected to the upper and lower wall surfaces 28, 29 in the vertical direction. A vertical length of the stepped opening 32 is about equal to a vertical thickness of an intermediate portion 53 of the terminal fitting 50 to be described later. As shown in FIGS. 6 and 7, guiding portions 32A expanded rearward in a tapered manner are provided on the rear ends of the stepped openings 32.

As shown in FIG. 5, the housing 20 is provided with the interpolar walls 33 partitioning between adjacent ones of the holes 30. The rear surfaces 33A of the interpolar walls 33 are located forward of the upper and lower wall surfaces 28, 29. The housing 20 includes recesses 34, the rear surfaces 33A of the interpolar walls 33 serving as back surfaces of the recesses 34.

As shown in FIGS. 2 and 4, the rear surface of the housing 20 has side wall surfaces 22B on both end parts in the lateral direction. The side wall surfaces 22B constitute a left region of the left hole 30 and a right region of the right hole 30, out of the holes 30 arranged on both ends in the lateral direction, and are located rearward of the rear surfaces 33A of the interpolar walls 33. A left opening of the hole 30 arranged on the left end is a left edge of a rear opening of the hole 30. A right opening of the hole 30 arranged on the right end is a right edge of a rear opening of the hole 30. The left and right side wall surfaces 22B are connected to the upper and lower wall surfaces 28, 29 in the vertical direction.

Figure 8:
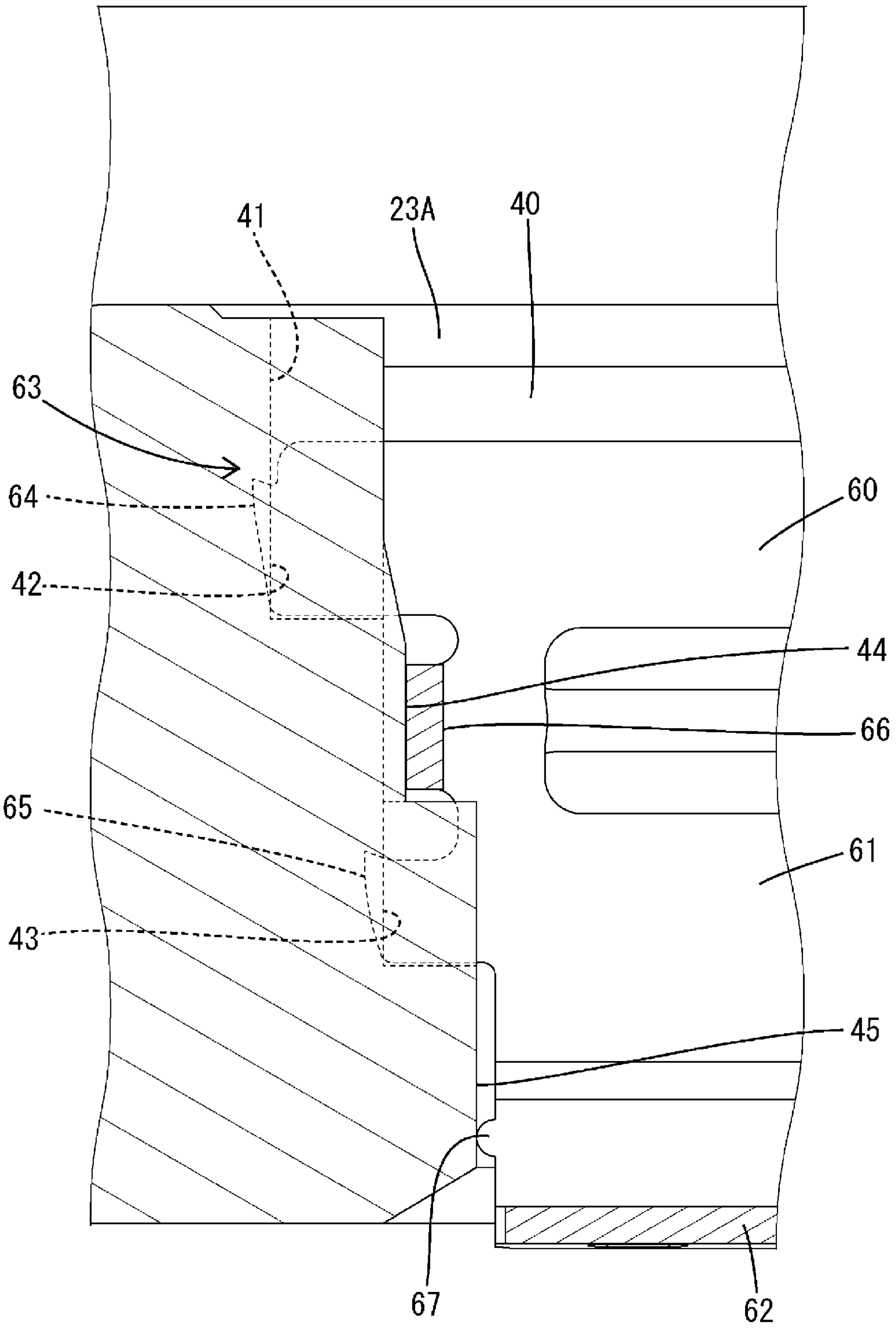
FIG. 8 is a section along D-D of FIG. 4.
Figure 9:
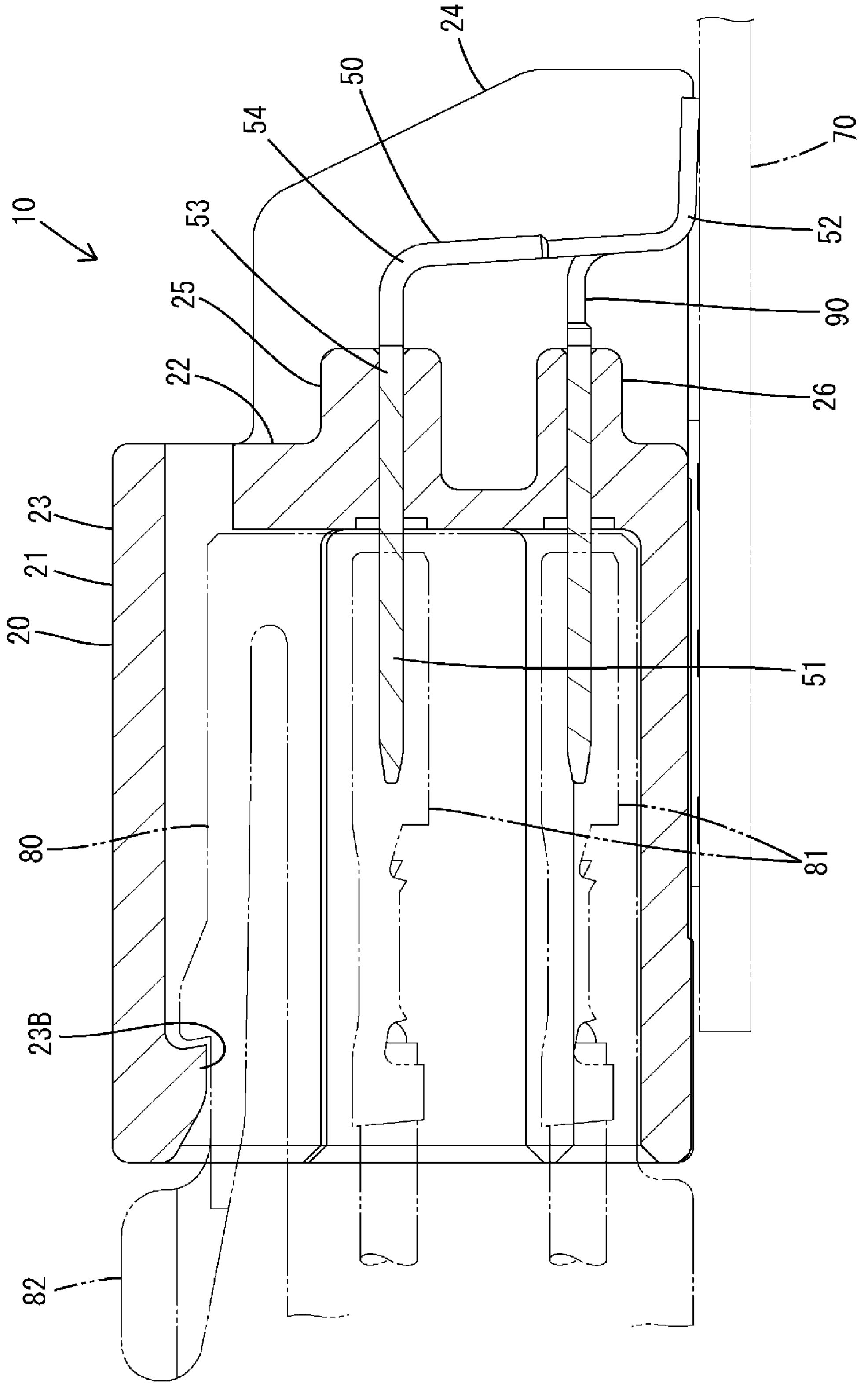
FIG. 9 is a section along E-E of FIG. 2.

As shown in FIG. 8, mounting surfaces 40 are provided by recessing the outer surfaces of the both side walls 23A of the fitting portion 23. The mounting surfaces 40 are arranged along the vertical direction and lateral direction. The both side walls 23A include front and rear receiving portions 41 on both front and rear sides of the mounting surfaces 40. The receiving portions 41 receive locking portions 63 of the fixing members 60 to be described later. The front receiving portions 41 are described below, but the rear receiving portions 41 are similarly configured. The receiving portion 41 includes an upper groove 42, a lower groove 43, a side surface rib 44 and an extending portion 45. The upper groove 42 is a groove constituting an upper end part of the receiving portion 41 and recessed forward. An upper protruding portion 64 of the fixing member 60 to be described is locked into the upper groove 42. The lower groove 43 is a groove constituting a lower end part of the receiving portion 41 and recessed forward. A lower protruding portion 65 of the fixing member 60 to be described is locked into the lower groove 43. The side surface rib 44 is provided between the upper and lower grooves 42, 43 in the receiving portion 41. The side surface rib 44 is a projecting piece projecting rearward and long in the vertical direction. The upper end of the side surface rib 44 is inclined downward toward the rear. The side surface rib 44 contacts a bent portion 66 of the fixing member 60 to be described later. The extending portion 45 is provided below the lower groove 43 in the receiving portion 41. The extending portion 45 is a wall projecting rearward. A protrusion 67 of the fixing member 60 to be described later contacts the extending portion 45.

<Terminal Fittings>

Figure 10:
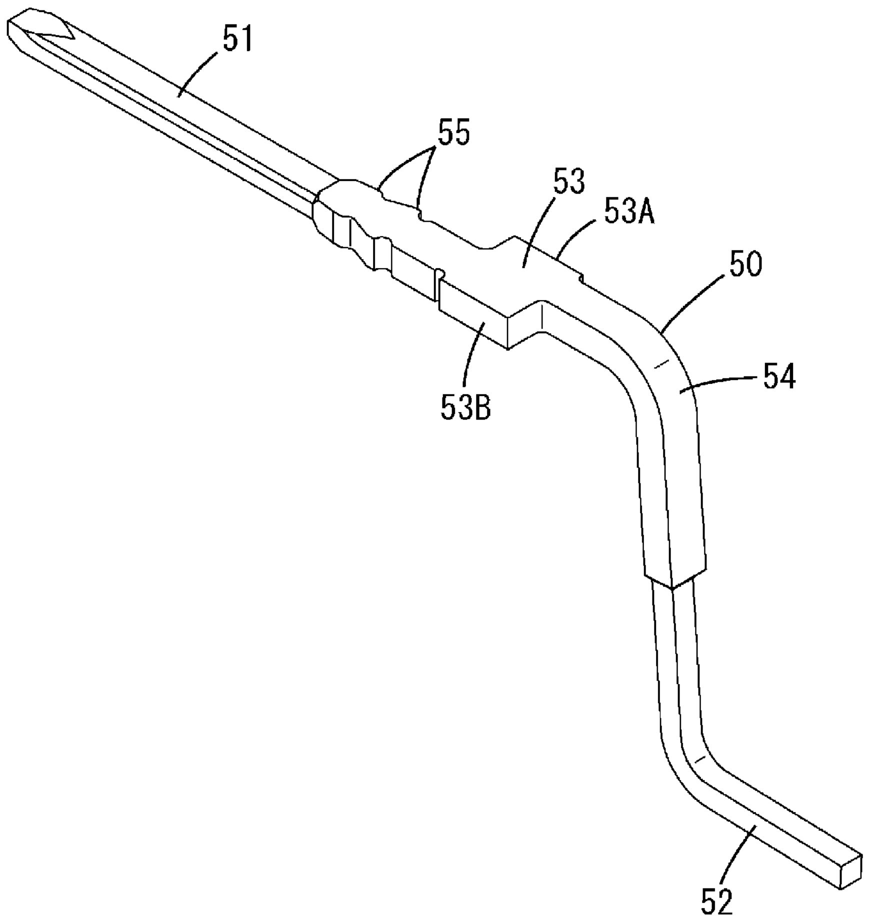
FIG. 10 is a perspective view of a terminal fitting.
Figure 11:
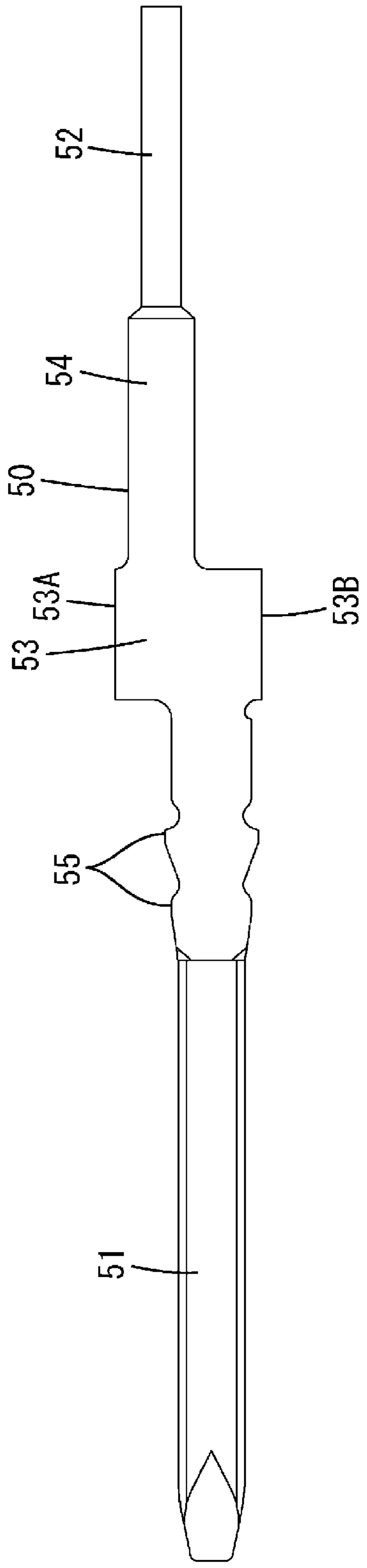
FIG. 11 is a plan view of the terminal fitting.

The terminal fittings 50 to be held in the holes 30 in the upper stage are described below, but the terminal fittings 90 to be held in the holes 30 in the lower stage are similarly configured. Specifically, the configuration of the terminal fittings 90 is laterally inverted from that of the terminal fittings 50. The terminal fittings 90 have a shorter length than the terminal fittings 50. As shown in FIGS. 10 and 11, the terminal fitting 50 is in the form of a pin having a rectangular cross-section. The terminal fitting 50 is formed into a crank shape by being bent at a right angle at two longitudinal intermediate positions of a terminal base material. Specifically, the terminal fitting 50 includes the mate connecting portion 51, a board connecting portion 52, the intermediate portion 53 and the bent portion 54. The mate connecting portion 51 is electrically connected to a mating terminal fitting 81 held in the mating housing 80 when the housing 20 and the mating housing 80 are connected as shown in FIG. 9. The mate connecting portion 51 includes the claw-like locking pieces 55 protruding toward both sides in the lateral direction at a plurality of positions near a rear end. The locking pieces 55 are locked by biting into the inner surface of the hole body 31 of the housing 20.

The board connecting portion 52 is shaped to extend downward from the bent portion 54 and be bent rearward. A tip side of the board connecting portion 52 is arranged along the plate surface of the circuit board 70, and soldered and electrically connected to an electrically conductive portion (not shown) of the circuit board 70.

The intermediate portion 53 is interposed between the mate connecting portion 51 and the board connecting portion 52 (more specifically, the bent portion 54). The intermediate portion 53 includes protruding portions 53A, 53B protruding toward both left and right sides. As shown in FIG. 5, the protruding portions 53A, 53B are fit and arranged in the stepped openings 32 and include parts (rear ends) projecting rearward from the stepped openings 32. Front-rear dimensions of the protruding portions 53A, 53B are larger than those of the stepped openings 32. A lateral dimension of the rear end of the protruding portion 53B is larger than that of the rear end of the protruding portion 53A.

<Fixing Members>

The fixing member 60 is made of metal and in the form of a flat plate as a whole. As shown in FIGS. 1 and 4, two fixing members 60 are respectively mounted on the receptacle 21 in the both side walls 23A of the housing 20.

As shown in FIG. 1, the fixing member 60 includes a housing fixing portion 61 to be fixed to the housing 20 and a board fixing portion 62 to be fixed to the circuit board 70. The housing fixing portion 61 is in the form of a flat plate extending along the vertical direction. The locking portions 63 that enter the corresponding front and rear receiving portions 41 to be received are provided on both sides in the front-rear direction (plate width direction) of the housing fixing portion 61. The front locking portion 63 (see FIG. 8) is described below, but the rear locking portion 63 is similarly configured. The locking portion 63 includes the upper protruding portion 64, the lower protruding portion 65, the bent portion 66 and the protrusion 67. The upper protruding portion 64 constitutes the upper end of the locking portion 63 and protrudes forward. The lower protruding portion 65 constitutes a vertically middle part of the locking portion 63 and protrudes forward. The bent portion

66 is provided between the upper and lower protruding portions 64, 65 in the locking portion 63. The bent portion 66 is a plate piece bent at a right angle with respect to a plate surface of the housing fixing portion 61. The protrusion 67 is provided below the lower protruding portion 65 in the locking portion 63. The protrusion 67 projects forward along the plate surface of the housing fixing portion 61.

As described above, in the housing 20 of the connector 10 of the present disclosure, the rear surfaces 33A of the interpolar walls 33 located between adjacent ones of the holes 30 are constituted as the back surfaces of the recesses 34 and located forward of the upper and lower wall surfaces 28, 29. Thus, an external matter is less likely to directly contact the recesses 34 by being blocked by the upper and lower wall surfaces 28, 29. Therefore, the housing 20 can stably hold the terminal fittings 50.

The upper and lower ribs 25, 26 continuously extending in the lateral direction are provided to project on the rear surface of the housing 20, the rear parts of the plurality of holes 30 are provided inside the upper and lower ribs 25, 26, and the upper and lower wall surfaces 28, 29 are provided on the rear surfaces of the upper and lower ribs 25, 26. In this way, the rigidity of the housing 20 in the lateral direction is enhanced by the upper and lower ribs 25, 26, and the housing 20 is less likely to be warped. As a result, the arranged states and shapes of the recesses 34, the upper wall surface 28 and the lower wall surface 29 can be maintained.

The hole 30 includes the stepped openings 32 expanded toward the both left and right sides from the hole body 31 extending in the front-rear direction and open in the rear surfaces 33A of the interpolar walls 33, the terminal fitting 50 includes the protruding portions 53A, 53B protruding toward the both left and right sides in the intermediate portion 53 in the front-rear direction, and the protruding portions 53A, 53B are fit and arranged in the stepped openings 32 and have the parts projecting rearward from the stepped openings 32. In this way, the terminal fitting 50 can be inserted into the hole 30 of the housing 20 from behind by placing a jig on the rear surfaces of the protruding portions 53A, 53B. At this time, since rear end parts of the protruding portions 53A, 53B project rearward from the stepped openings 32, the contact of the jig with the interpolar walls 33 can be avoided.

The lateral dimension of the rear end of the protruding portion 53B, out of the protruding portions 53A, 53B protruding toward the both left and right sides, is larger than that of the rear end of the protruding portion 53A. In this way, the jig can be placed over a wide area of the rear end of the protruding portion 53B and a concern for the detachment of the jig from the protruding portion 53B can be reduced.

The rear surface of the housing 20 has the side wall surfaces 22B on the both end parts in the lateral direction, the side wall surfaces 22B constitute the left region of the left hole 30 and the right region of the right hole 30, out of the holes 30 arranged on the both ends in the lateral direction and are located rearward of the rear surfaces 33A of the interpolar walls 33 (back surfaces of the recesses 34). In this way, the side wall surfaces 22B are respectively provided, instead of the rear surfaces 33A of the interpolar walls 33, on the left and right sides of the holes 30 arranged on the both ends in the lateral direction. Thus, the housing 20 can enhance the strength of the holes 30 arranged on the both ends in the lateral direction and the terminal fittings 50 can be stably held in the holes 30.

Other Embodiments of Present Disclosure

The embodiment disclosed this time should be considered illustrative in all aspects, rather than restrictive. For example, the following embodiments can be adopted.

(1) Although the plurality of holes 30 are provided in two upper and lower stages in the housing 20 in the above embodiment, the plurality of holes 30 may be provided in one, three or more stages.

(2) Although the lateral dimension of the rear end of the protruding portion 53B is larger than that of the rear end of the protruding portion 53A in the above embodiment, a size relationship may be reversed or both rear ends may have about the same size.

(3) Although the terminal fittings 50 are press-fit and held in the holes 30 of the housing 20 in the above embodiment, the terminal fittings 50 may be held in the housing 20 by insert molding.

LIST OF REFERENCE NUMERALS

10 . . . connector
20 . . . housing
21 . . . receptacle
22 . . . back wall
22B . . . side wall surface
23 . . . fitting portion
23A . . . side wall
23B . . . lock portion
24 . . . protection wall
25 . . . upper rib (rib)
26 . . . lower rib (rib)
28 . . . upper wall surface
29 . . . lower wall surface
30 . . . hole
31 . . . hole body
32 . . . stepped opening
32A . . . guiding portion
33 . . . interpolar wall
33A . . . rear surface of interpolar wall
34 . . . recess
40 . . . mounting surface
41 . . . receiving portion
42 . . . upper groove
43 . . . lower groove
44 . . . side surface rib
45 . . . extending portion
50 . . . terminal fitting
51 . . . mate connecting portion
52 . . . board connecting portion
53 . . . intermediate portion
53A, 53B . . . protruding portion
54 . . . bent portion
55 . . . locking piece
60 . . . fixing member
61 . . . housing fixing portion
62 . . . board fixing portion
63 . . . locking portion
64 . . . upper protruding portion
65 . . . lower protruding portion
66 . . . bent portion
67 . . . protrusion
70 . . . circuit board
80 . . . mating housing
81 . . . mating terminal fitting
82 . . . lock arm
90 . . . terminal fitting

What is claimed is:

1. A connector, comprising:

a housing; and terminal fittings to be held in the housing, wherein:

the housing includes:

a plurality of holes arranged in a lateral direction, the terminal fittings being arranged inside the holes;

an upper wall surface and a lower wall surface constituting upper and lower regions above and below the plurality of holes arranged in the lateral direction on a rear surface of the housing; and interpolar walls partitioning between the holes adjacent in the lateral direction, rear surfaces of the interpolar walls are located forward of the upper wall surface and the lower wall surface, and the housing includes recesses, the rear surfaces of the interpolar walls serving as back surfaces of the recesses.

2. The connector of claim 1, wherein a rib continuously extending in the lateral direction is provided to project on the rear surface of the housing, rear parts of the plurality of holes are provided inside the rib, and the upper wall surface and the lower wall surface are provided on a rear surface of the rib.

3. The connector of claim 1, wherein:

the hole includes a hole body extending in a front-rear direction and stepped openings expanded toward both left and right sides from the hole body and open in the rear surfaces of the interpolar walls, the terminal fitting includes protruding portions protruding toward the both left and right sides in an intermediate portion in the front-rear direction, and the protruding portions are fit and arranged in the stepped openings and include parts projecting rearward from the stepped openings.

4. The connector of claim 3, wherein a lateral dimension of a rear end of one of the protruding portions protruding toward the both left and right sides is larger than a lateral dimension of a rear end of the other protruding portion.

5. The connector of claim 1, wherein:

the rear surface of the housing has side wall surfaces on both end parts in the lateral direction, and the side wall surfaces constitute a left region of the left hole and a right region of the right hole, out of the holes arranged on both ends in the lateral direction and are located rearward of the rear surfaces of the interpolar walls.

* * * * *